US012591302B2

(12) United States Patent
Lau

(10) Patent No.: US 12,591,302 B2
(45) Date of Patent: Mar. 31, 2026

(54) GENERATING AI-CURATED AR CONTENT BASED ON COLLECTED USER INTEREST LABELS

(71) Applicant: SAMSUNG ELECTRONICS CO., LTD., Suwon-si (KR)

(72) Inventor: Jonathan Howkan Lau, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/901,723

(22) Filed: Sep. 30, 2024

(65) Prior Publication Data

US 2025/0264937 A1 Aug. 21, 2025

Related U.S. Application Data

(60) Provisional application No. 63/554,068, filed on Feb. 15, 2024.

(51) Int. Cl.
*G06F 3/01* (2006.01)
*G01S 19/14* (2010.01)
*G06T 19/00* (2011.01)
*H04L 67/306* (2022.01)

(52) U.S. Cl.
CPC .............. *G06F 3/013* (2013.01); *G01S 19/14* (2013.01); *G06T 19/006* (2013.01); *H04L 67/306* (2013.01)

(58) Field of Classification Search
CPC ....... G06F 3/013; G01S 19/14; G06T 19/006; H04L 67/306
See application file for complete search history.

(56) References Cited

U.S. PATENT DOCUMENTS

| | | | |
|---|---|---|---|
| 10,963,940 | B2 | 3/2021 | Piramuthu et al. |
| 11,537,623 | B2 | 12/2022 | Gao et al. |
| 11,544,777 | B2 | 1/2023 | Silberstein et al. |
| 11,580,592 | B2 | 2/2023 | Berger et al. |
| 2014/0316305 | A1 * | 10/2014 | Venkatraman .......... G01S 19/49 600/595 |
| 2015/0032814 | A1 | 1/2015 | Broustas et al. |
| 2018/0240253 | A1 * | 8/2018 | Nishita ..................... G06T 7/77 |
| 2020/0111148 | A1 * | 4/2020 | Soni ........................ G06F 3/015 |
| 2021/0056750 | A1 * | 2/2021 | Rowley ................. G06F 3/016 |
| 2023/0025304 | A1 | 1/2023 | Chandrashekar et al. |
| 2023/0244309 | A1 | 8/2023 | Ahn et al. |

FOREIGN PATENT DOCUMENTS

| | | | | |
|---|---|---|---|---|
| WO | WO-2016183541 A1 * | 11/2016 | .......... | H04L 63/168 |
| WO | WO-2025122166 A1 * | 6/2025 | ............. | G06F 3/167 |

* cited by examiner

*Primary Examiner* — Stephen G Sherman
(74) *Attorney, Agent, or Firm* — Sughrue Mion, PLLC

(57) ABSTRACT

Systems, devices, and methods for generating a customized content item, including: detecting a user interest of a user in an object; based on the detecting of the user interest, determining an interest level corresponding to the object; obtaining a content item to be presented to the user; based on the interest level corresponding to the object being greater than a predetermined threshold interest level, providing information about the object along with the content item to a generative artificial intelligence (AI) model to obtain the customized content item; and presenting the customized content item to the user using an augmented reality (AR) device.

20 Claims, 5 Drawing Sheets

FIG. 2
200
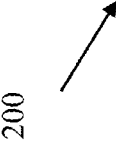
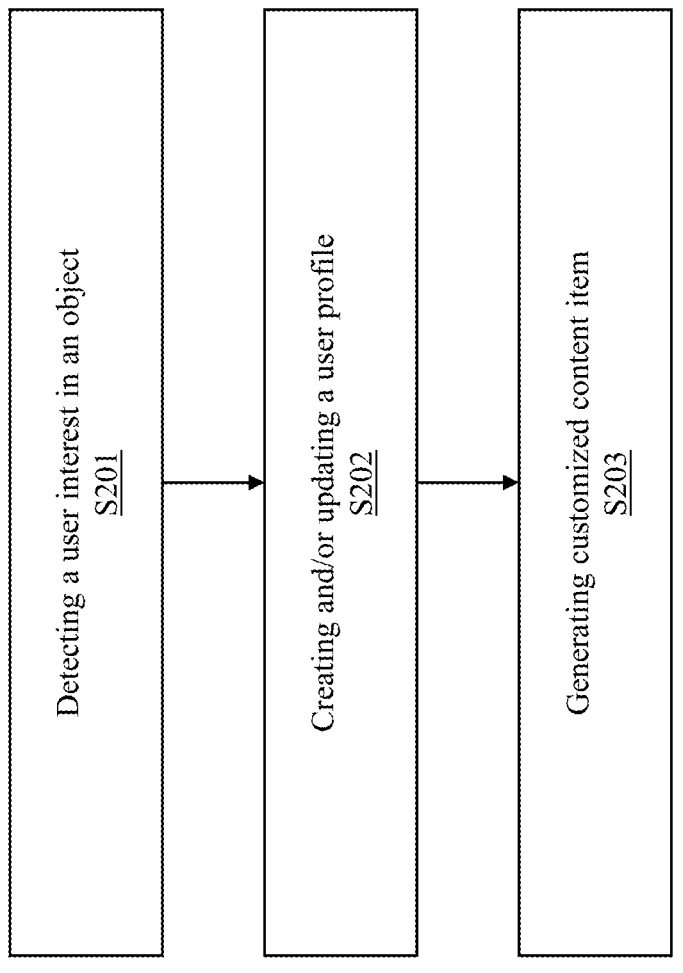
Detecting a user interest in an object
S201
Creating and/or updating a user profile
S202
Generating customized content item
S203

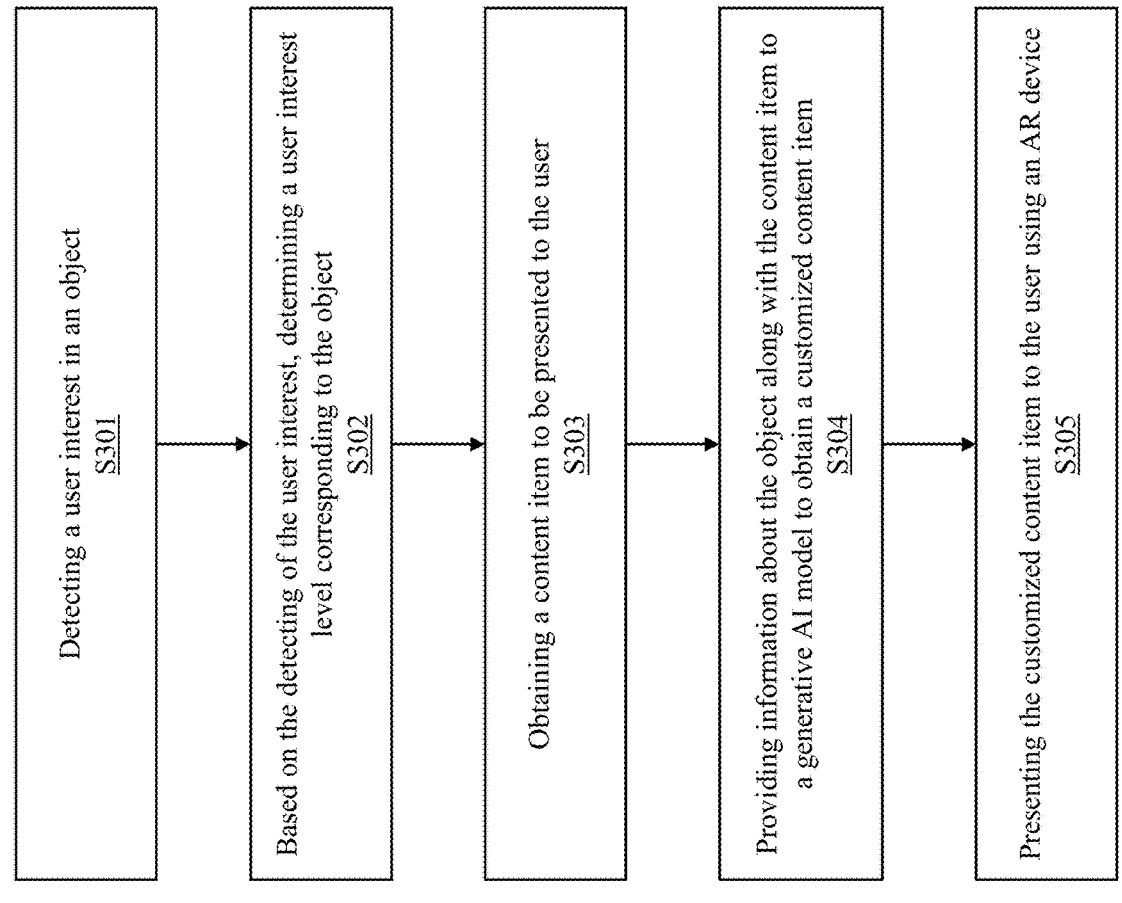

Detecting a user interest in an object
S301

Based on the detecting of the user interest, determining a user interest level corresponding to the object
S302

Obtaining a content item to be presented to the user
S303

Providing information about the object along with the content item to a generative AI model to obtain a customized content item
S304

Presenting the customized content item to the user using an AR device
S305

Figure 5:
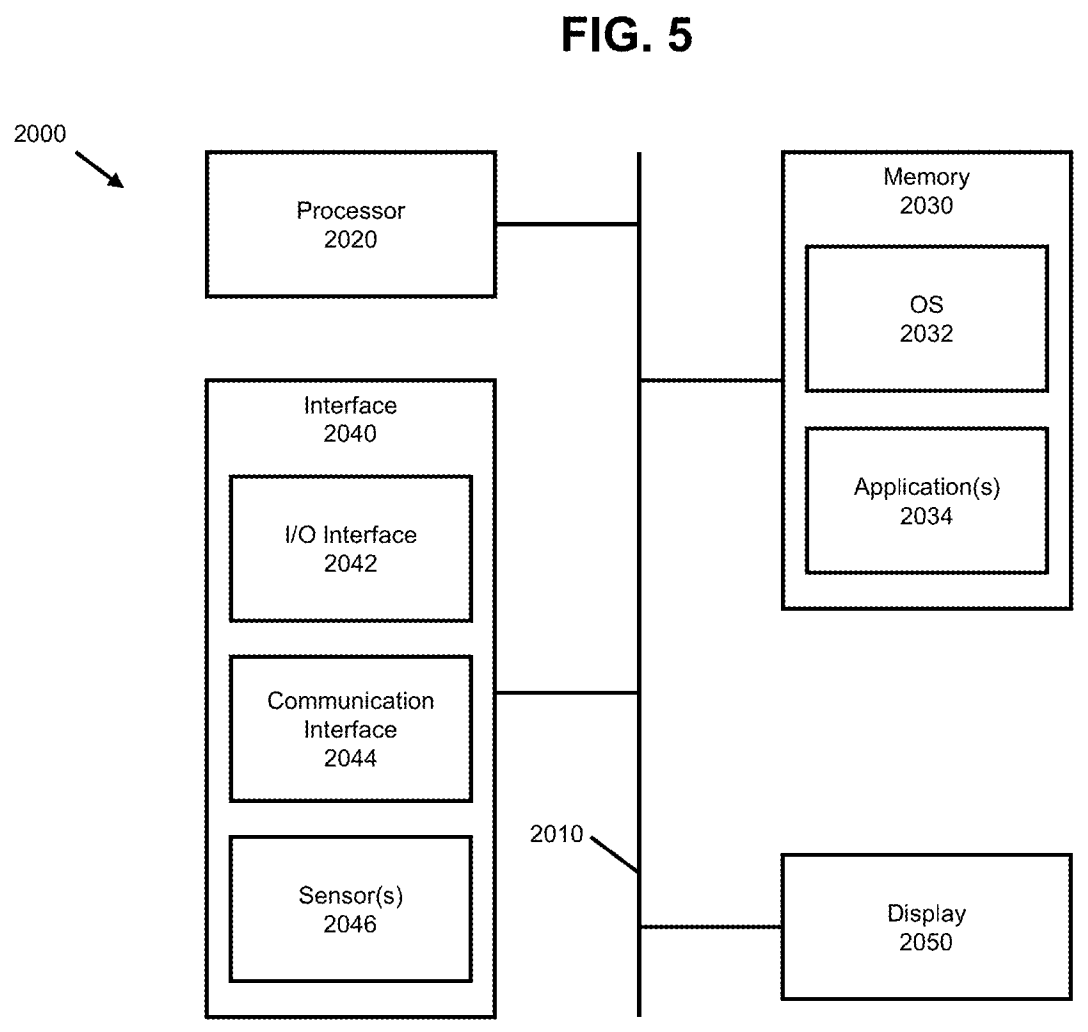

Processor
2020

Memory
2030

OS
2032

Application(s)
2034

Display
2050

2010

Interface
2040

I/O Interface
2042

Communication
Interface
2044

Sensor(s)
2046

GENERATING AI-CURATED AR CONTENT BASED ON COLLECTED USER INTEREST LABELS

CROSS-REFERENCE TO RELATED APPLICATION(S)

This application is based on and claims priority under 35 U.S.C. § 119 to U.S. Provisional Patent Application No. 63/554,068 filed on Feb. 15, 2024, in the U.S. Patent & Trademark Office, the disclosure of which is incorporated herein by reference in its entirety.

BACKGROUND

1. Field

The disclosure relates to an augmented reality (AR) device, and more particularly to an AR device for generating customized content items.

2. Description of Related Art

Augmented reality (AR) devices may refer to devices which may be used to present or display virtual content to a user superimposed on the user's view of the real world. AR devices may present interesting opportunities for delivering targeted content items such as advertisements and informational content.

However, users that are not interested in a particular content item may not watch or engage with the content item, and it may be difficult or expensive to create many different content items to appeal to a large variety of different interests.

SUMMARY

One or more embodiments of the present disclosure provide a method of generating and providing a customized content item which may be customized or curated for a user based on detected interests of the user.

In accordance with an aspect of the disclosure, a method for generating a customized content item includes: detecting a user interest of a user in an object; based on the detecting of the user interest, determining an interest level corresponding to the object; obtaining a content item to be presented to the user; based on the interest level corresponding to the object being greater than a predetermined threshold interest level, providing information about the object along with the content item to a generative artificial intelligence (AI) model to obtain the customized content item; and presenting the customized content item to the user using an augmented reality (AR) device.

The user interest may be detected based on at least one of: determining that the user is at a location corresponding to the object, and determining that a gaze of the user is directed toward the object.

The interest level may be determined based on biological information of the user collected while at least one of the user is at the location corresponding to the object and the gaze of the user is directed toward the object.

The biological information may include at least one of a heart rate of the user, a pupil dilation of the user, a direction of the gaze, and a duration of the gaze.

At least one of the direction of the gaze, the duration of the gaze, and the pupil dilation may be determined using an eye-tracking sensor included in the AR device, the heart rate may be determined using at least one of an optical sensor and an electrical sensor included in the AR device, and the location of the user may be determined using at least one of a camera included in the AR device and a global navigation satellite systems (GNSS) receiver included in the AR device.

The object may include at least one of a real object detected in an environment of the user using a camera included in the AR device, and a virtual object presented to the user using a display included in the AR device.

The method may further include: based on determining that the interest level is greater than the predetermined threshold interest level, updating a user profile associated with the user to include information about the object, the user profile may include information about at least one object for which a previous user interest has been detected, and the information about the object may be selected to be provided to the generative AI model based on the interest level and a similarity between the object and a theme corresponding to the content item.

The content item may be obtained based on determining that the user is at a location corresponding to the content item.

The customized content item may include at least one of an image, a video, and a text.

In accordance with an aspect of the disclosure, an augmented reality (AR) device for generating a customized content item includes: an eye-tracking sensor configured to obtain gaze information about a gaze of a user; a location sensor configured to determine location information about a location of the user; at least one biological sensor configured to measure biological information of the user; a display configured to present content items to the user; and at least one processor configured to: detect a user interest of the user in an object based on at least one of the gaze information and the location information; based on the detecting of the user interest, determine an interest level corresponding to the object based on at least one of the gaze information and the biological information; obtain a content item to be presented to the user; based on the interest level being greater than a predetermined threshold interest level, provide the object and the content item to a generative artificial intelligence (AI) model to obtain the customized content item; present the customized content item to the user.

The user interest may be detected based on at least one of: determining that the user is at a location corresponding to the object, and determining that the gaze of the user is directed toward the object.

The biological information of the user may be collected while at least one of the user is at the location corresponding to the object and the gaze of the user is directed toward the object.

The biological information may include at least one of a heart rate of the user, a pupil dilation of the user, a direction of the gaze, and a duration of the gaze.

At least one of the direction of the gaze, the duration of the gaze, and the pupil dilation may be determined using the eye-tracking sensor included in the AR device, the heart rate may be determined using at least one of an optical sensor and an electrical sensor included in the AR device, and the location of the user may be determined using at least one of a camera included in the AR device and a global navigation satellite systems (GNSS) receiver included in the AR device.

The object may include at least one of a real object detected in an environment of the user using a camera included in the AR device, and a virtual object presented to the user using the display.

The at least one processor may be further configured to, based on determining that the interest level is greater than the predetermined threshold interest level, update a user profile associated with the user to include information about the object, the user profile may include information about at least one object for which a previous user interest has been detected, and the information about the object may be selected to be provided to the generative AI model based on the interest level and a similarity between the object and a theme corresponding to the content item.

The content item may be obtained based on determining that the user is at a location corresponding to the content item.

The customized content item may include at least one of an image, a video, and a text.

In accordance with an aspect of the disclosure, a non-transitory computer-readable medium may store instructions which, when executed by at least one processor of a device for generating a customized content item, cause the at least one processor to: detect a user interest of a user in an object; based on the detecting of the user interest, determining an interest level corresponding to the object; obtain a content item to be presented to the user; based on the interest level corresponding to the object being greater than a predetermined threshold interest level, provide information about the object along with the content item to a generative artificial intelligence (AI) model to obtain the customized content item; and present the customized content item to the user using an augmented reality (AR) device.

BRIEF DESCRIPTION OF THE DRAWINGS

The above and other aspects, features, and aspects of embodiments of the disclosure will be more apparent from the following description taken in conjunction with the accompanying drawings, in which:

FIG. 2 is a flowchart of a process for generating customized content items, according to embodiments of the present disclosure;

FIG. 3 is a flowchart of a process for generating customized content items, according to embodiments of the present disclosure;

FIG. 5 is a diagram of components of one or more devices of FIG. 4 according to embodiments of the present disclosure.

DETAILED DESCRIPTION

Figure 1:
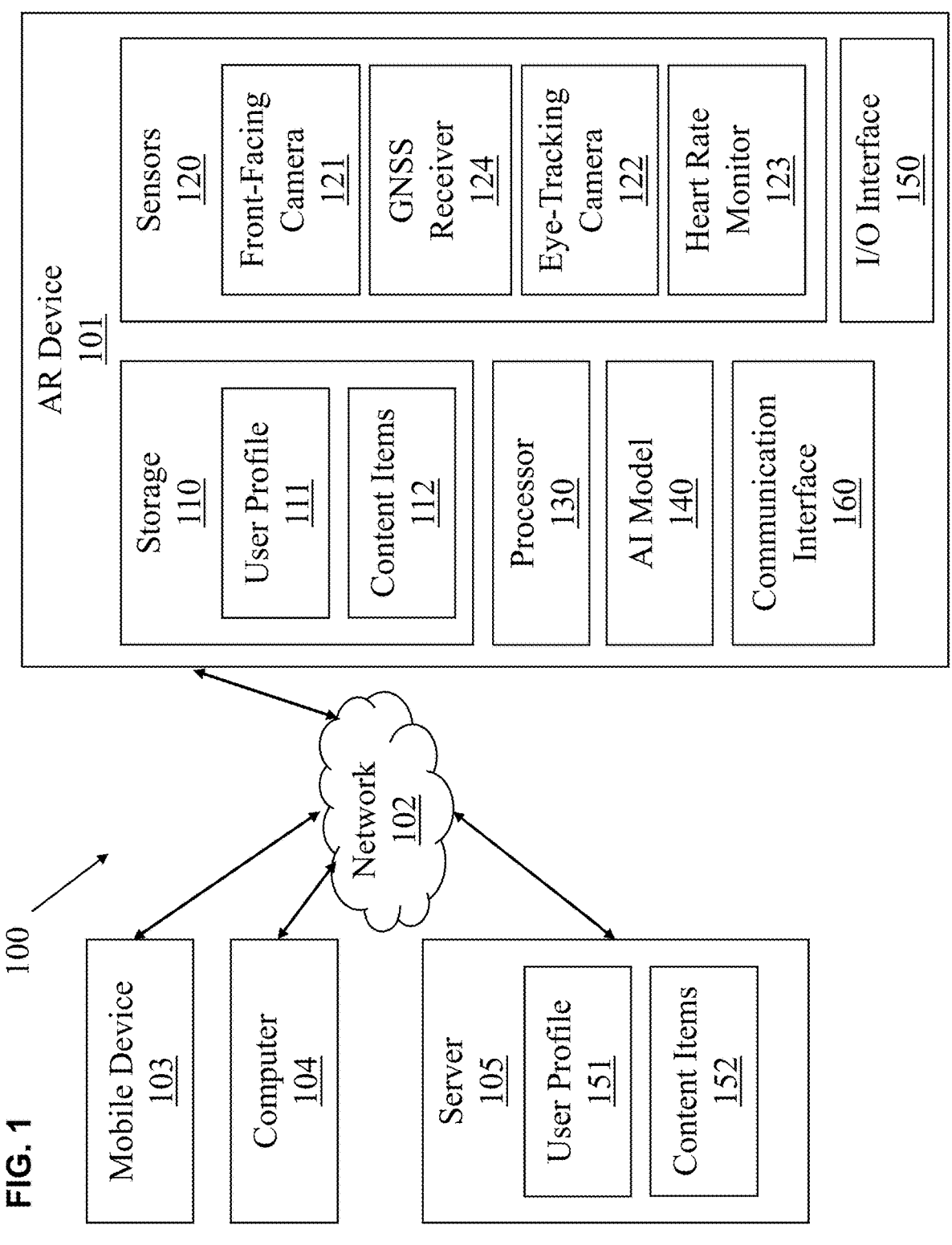
FIG. 1 is a diagram of a system for generating customized content items, according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" or "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

One or more embodiments of the present disclosure provide systems, methods, and apparatuses for generating customized content items. As artificial intelligence (AI) models such generative AI models become more prevalent, they may be used by users to complete everyday tasks. This technology has the potential to be used by users on the go, and capture real-world events happening around the user. For example, user devices such as augmented reality (AR) devices may allow for collection of additional information which may allow AI models to generate a more engaging user experience.

One way to enhance the user experience is to deliver content items to the user that are curated or customized based on the user's interests. According to embodiments, an AR device may allow information about the user's current reaction to present stimulus to be collected and stored, for example in a user profile, and provided to an AI model. As a result, when a user subsequently encounters a location or an object that the AI model predicts is likely an interest to the user, the AR device may be used to present a content item such as an AI-generated video advertisement to the user, which may for example allow local businesses to be more accessible to the user. Accordingly, embodiments may provide a closer connection between the digital information and real world information to expose users to new experiences that may not otherwise be encountered.

Accordingly, embodiments may relate to an augmented reality device which may use personal preferences of a user to generate content that is curated or customized for the user. Embodiments may relate to converting user interests based on various benchmarks that translate the user's interest in an object into trigger labels which may assist an AI model such as a generative AI model in creating a content item such as an advertisement. For example, the AR device may include sensors which may collect information about the user when the user encounters a location or an object. For example, the sensors of the AR device may collect biological information such as heart rate and pupil dilation, location information such as global navigation satellite system (GNSS), and information about a user's focus such as eye tracking information. Using this information, the user's likely interests may be categorized into labels. Then, an AI model such as a generative AI model may be used to generate content items such as video or interactive advertisements based on the labels. This may allow the user to view the content items in a real time space. In some embodiments, the type of content provided to the user may be more reactive than nonreactive. Accordingly, the process of providing quick and enticing advertisements catered to a number of specific audiences may be simplified.

FIG. 1 is a diagram of a system for generating customized content items, according to embodiments of the present disclosure. As shown in FIG. 1, the system 100 may include an AR device 101, a network 102, a mobile device 103, a computer 104, and a server 105.

The AR device 101 may include a storage 110, one or more sensors 120, a processor 130, at least one AI model 140, an input/output (I/O) interface 150, and a communication interface 160.

The communication interface 160 may include at least one transceiver-like component (e.g., a transceiver, a separate receiver and transmitter, a bus, etc.) that enables the components of AR device 101 to communicate with each other and/or to communicate with one or more components external to the AR device 101, such as via a wired connection, a wireless connection, or a combination of wired and wireless connections.

For example, the communication interface 160 may couple the processor 130 to the storage 110 to thereby enable them to communicate and to interoperate with each other in performing one or more operations. As another example, the communication interface 160 may couple the AR device 101 (or one or more components included therein) to other elements included in the system 100, for example using the network 102, so as to enable them to communicate and to interoperate with each other.

According to one or more embodiments, the communication interface 160 may include one or more application programming interfaces (APIs) which allow the AR device 101 (or one or more components included therein) to communicate with one or more software applications.

The I/O interface 150 may include at least one component that permits the AR device 101 to receive information and/or to provide output information. It can be understood that, in some embodiments, the I/O interface 150 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 110 may include one or more storage mediums suitable for storing data, information, and/or computer-executable instructions therein. According to embodiments, the storage 110 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 130. Additionally or alternatively, the storage 110 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 110 may be configured to store information, such as a user profile 111 and one or more content items 112. Additionally or alternatively, the storage 110 may be configured to store one or more information associated with one or more operations performed by at least one of the processor 130 and the AI model 140.

In some implementations, the storage 110 may include a plurality of storage mediums, and the storage 110 may be configured to store a duplicate or a copy of at least a portion of the information in the plurality of storage mediums, for providing redundancy and for backing-up the information or the associated data. Furthermore, the storage 110 may also store computer-readable or computer-executable instructions which, when being executed by one or more processors (e.g., the processor 130), causes the one or more processors to perform one or more actions/operations described herein.

The processor 130 may include at least one processor capable of being programmed or being configured to perform a function(s) or an operation(s) described herein. For example, the processor 130 may be configured to execute computer-executable instructions stored in at least one storage medium or a memory storage (e.g., the storage 110, etc.) to thereby perform one or more actions or one or more operations described herein.

According to embodiments, the processor 130 may be configured to receive (e.g., via the communication interface 160, via the I/O interface 150, etc.) one or more signals and/or one or more user inputs defining one or more instructions for performing one or more operations. Further, the processor 130 may be implemented in hardware, firmware, or a combination of hardware and software. For example, processor 130 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

The sensors 120 may be used to collect information about a user and an environment of the user. For example, the AR device 101 may use one or more of the sensors 120 to collect information about an object or a location encountered by the user, as well as the user's interest in and/or reaction to the object or location. For example, the sensors 120 may include sensors directed toward the environment of the user, for example a front-facing camera 121 and a GNSS receiver 124, which may be used to collect information about the object or the location. In addition, the sensors 120 may include sensors directed toward the user, for example an eye-tracking camera 122 and a heart rate monitor 123, which may be used to collect information about the user, for example information about the user's interest in and/or reaction to the object or the location. For example, in embodiments the heart rate monitor 123 may include an electrical sensor and/or an optical sensor which may be used to detect an electrocardiogram (ECG) signal and/or a photoplethysmography (PPG) signal of the user. The AR device 101 may use the information collected by the sensors to create and update the user profile 111 stored in the storage 110. For example, the AR device 101 may determine a likely interest of the user based on the information collected by the sensors 120, and may update the user profile 111 based on the information about the likely interest.

The AI model 140 may include one or more AI models such as neural networks or machine learning models. For example, the AI model 140 may be or may include a generative AI model such as a generative adversarial network (GAN), a diffusion model, a transformer model, a variational auto-encoder, or any other type of model which may be suitable for generating and/or modifying the content items 112, for example based on information from the sensors 120 and/or the user profile 111. As another example, the AI model 140 may be or may include a classifier model which may be used to label or classify a user's likely interest based on information collected by the sensors 120, and may be used by the AR device 101 to create or update the user profile 111. As yet another example, the AI model 140 may be or may include an object recognition model which may be used by the AR device to recognize objects included in images captured by the front-facing camera 121 and the eye-tracking camera 122.

According to embodiments, the user profile 111 may also be updated based on information about activities of the user which may be received from an external device, for example at least one of the mobile device 103 the computer 104, and the server 105. In addition, a corresponding user profile 151 may be stored on the server 105, and may be updated in conjunction with the user profile 111. For example, the server 105 may create or update the user profile 151 based on information received from at least one of the AR device 101, the mobile device 103, and the computer 104, and may provide information about the updated user profile 151 to the AR device 101 so that the user profile 111 may be updated. Further, the server 105 may store content items 152, which may be provided to the AR device 101 to be presented to the user, with or without modifications.

In embodiments, the network 102 may be or may include, for example, a long-range communication network such as a cellular network or other network that may allow the AR device 101 to connect to the Internet, and the server 105 may provide the content items 152 to the AR device 101 over the Internet. However, embodiments are not limited thereto. For example, in some embodiments the network 102 may be, or may include, a short-range communication network, and the server 105 may be operated for example by a business that is visited by the user, and may provide the content items 152 to the AR device 101 based on the user visiting a location of the business.

It will be understood that the system 100 may include more or less components than as illustrated in FIG. 1, and/or the components may be arranged in a manner different from FIG. 1, without departing from the scope of the present disclosure. For example, in some embodiments the system 100 may not include at least one of the mobile device 103 and the computer 104, and may include more or different devices associated with the user. As another example, in some embodiments, one or more of the AI model 140 and the sensors 120 may be included in at least one of the server 105, the computer 104, and the mobile device 103, and may communicate with the AR device 101 using the network 102 in order to send or receive information or content items.

FIG. 2 illustrates a process for generating customized content items, according to embodiments of the present disclosure. In embodiments, one or more operations of the process 200 may be performed by any of the elements discussed above, for example at least one of the system 100 and the elements included in therein. According to embodiments, the process 200 may be referred to as, or may be an example of, a customized content item generation method.

In operation S201, the process 200 may include detecting a user interest in an object. According to embodiments, the AR device 101 may determine perform a two-step determination, which may include an initial detection of the user interest, and a determination about an interest level of the user interest.

For example, the AR device 101 may initially detect the user interest in the object based on at least one of a gaze direction of the user, which may be determined using at least one of the front-facing camera 121 and the eye-tracking camera 122, and a location of the user, which may be determined using at least one of the GNSS receiver 124 and the front-facing camera 121. For example, the AR device 101 may detect a user interest in a particular object by detecting the object using the front-facing camera 121, determining that the user's gaze is directed at the object using the eye-tracking camera 122, and/or identifying the object using an image of the object captured by the front-facing camera 121 and/or a location of the object determined using the GNSS receiver 124. Although examples are described herein in which the object is a real object that is physically present in an environment of the user, embodiments are not limited thereto. For example, in some embodiments the object may be a virtual object included in AR content displayed to the user by the AR device 101.

Next, the interest level of the user interest may be determined using information about the user collected by the sensors 120. For example, the AR device 101 may determine that the interest level of the user is relatively high by detecting at least one of an increased pupil dilation using the eye-tracking camera 122, and an elevated heart rate of the user using the heart rate monitor 123. In some embodiments, the interest level of the user may also be determined based on facial expressions (e.g., facial expressions of happiness such as a smile) detected using the eye-tracking camera 122. According to embodiments, the interest level of the user may also be determined based on information collected by other sensors 120. For example, the AR device 101 may determine that the interest level of the user is relatively high by determining that the user has remained in a particular location for a time period that is greater than a predetermined time period using the GNSS receiver 124, or that the gaze of the user is directed toward the object for a time period that is greater than a predetermined time period. According to embodiments, the AR device 101 may also detect the user interest by using the front-facing camera 121 to capture images of text read by the user to determine the user's reading preferences.

In some embodiments, the AR device 101 may constantly gather information using the sensors 120 while the user performs day-to-day tasks, and may for example store the information along with a timestamp indicating a time at which the information was collected or recorded. Accordingly, the AR device 101 may sort or rank the user's interests according to the timestamps. For example, the AR device 101 may weight or rank recent user interests more highly than past user interests, but embodiments are not limited thereto.

In operation S202, the process 200 may include creating and/or updating the user profile 111 based on the detected user interest and the level of the detected user interest. According to embodiments the AR device 101 may categorize user's interest into labels based on the collected information such as the heart rate of the user, the pupil dilation of the user, the time spent by the user at the particular location, and the gaze direction of the user, but embodiments are not limited thereto. According to embodiments, the AR device 101 may compare each type of information to a threshold or benchmark, and may update the user profile 111 based on a result of the comparison. For example, the AR device 101 may update the user profile to indicate a high interest level in an object based on determining that the heart rate of the user is higher than a normal heart rate of the user, for example an average heart rate of the user over a predetermined period of time, or in similar situations. In addition, the AR device 101 may update the user profile to indicate a high interest level in the object based on determining that the pupil of the user is larger than a normal pupil dilation of the user (e.g., one half of a millimeter larger than an average pupil dilation), that the user's gaze was directed at the object for greater than a predetermined period of time (e.g., eight seconds), that a particular word appeared in the user's field of view greater than a predetermined number of times, that a user has visited a location corresponding to the object greater than a predetermined number of times, etc.

According to embodiments, excitement reactions may provide a more accurate indication of interest level than curiosity reactions, and the information collected by the sensors 120 may allow the AR device to distinguish excitement reactions from curiosity reactions and update the user profile 111 accordingly. In addition, the AR device 101 may consider a plurality of these data points together to determine an overall interest level in the object and update the user profile 111 accordingly.

In some embodiments, the AR device 101 may use the AI model 140 to classify and/or label the user interests, and may update the user profile 111 based on the classifications and/or labels. In addition, the AR device 101 may request the user to review or survey the user profile 111 to confirm or modify the identified user interests in order to reduce false positives. Reduce false positives with model training classified interest labels with actual survey of user's interests.

In operation S203, the process 200 may include generating a customized content item. According to embodiments, the AR device 101 may use the AI model 140 to create or modify a content item such as a video advertisement, AR content, and text content based on the information stored in the user profile. For example, the content item may be created or modified to correspond to the labels that the user is most interested in. In some embodiments, the content item may be entirely generated on the AR device 101, but embodiments are not limited thereto. For example, the content item may be a general content item that is received from the server 105 (e.g., a content item 152) and is then customized by the AR model 140 based on the information stored in the user profile 111. As another example, the content item may be a pre-stored content item that is stored in the storage 110 (e.g., a content item 112). Accordingly, the process 200 may be performed even when the AR device 101 is not connected to the network 102, for example when the user is using the AR device 101 in an area in which the user does not have access to the network 102, or in which the connection is deactivated.

According to embodiments, the labels or other information indicating user interests may be ranked, for example in an order corresponding to at least one from among interest level, frequency, and recency. Then, the AI model 140 may create or modify the content item based on a highest ranked label, or a label that is ranked higher than a threshold rank. According to embodiments, the AR device 101 may collect media such as images, videos, text, and audio clips related to user interests to be used by the AI model 140 to generate the customized content item.

In some embodiments, the AI model 140 may be trained to generate advertisement and product presentation in order to generate an image, a video, a text, or other AR content to be used as the customized content item. For example, the AI model 140 may interpret the type of image, video, text, or other AR content to create based on user interests indicated by the user profile 111. This interpretation may be generated according to a top-ranked user interest in a particular category capable of creating a coherent video or content. For example, a theme surrounding the product or item to be advertised may be determined based on a top-ranked user interest in a category that relates to the embodiments are not limited thereto, and the AI model 140 may generate the customized content item according to the theme. However, embodiments are not limited thereto, and the customized content item may be generated based on any other consideration as desired.

Accordingly, the process 200 may allow a content item presented to the user to be customized to appeal to the user based on detected user interests and corresponding interest level. For example, when the user approaches a business which sells a product, the AR device 101 may present to the user a customized content item such as an image, a video, a text, or other AR content that corresponds to the product anchored near the entrance of the business. The customized content item may be unique to the time that it was created because it may be generated by the AI model 140 based on the user's current top ranked interests. As a result, if the user subsequently approaches the same business, the AR device 101 may present a new customized content item corresponding to the product, which may be created by the AI model 140 based on new interests of the user. Therefore, embodiments may allow content items such as advertisements to remain relevant despite changes in the user's interests.

For example, according to embodiments, the AR device 101 may generate a user profile 111 based on information about user interests collected while the user previously used the AR device 101. Subsequently, the user may visit a shopping mall, and the AR device 101 may collect information about the user's reaction to various objects in the shopping mall using the sensors 120. The user may encounter a store within the shopping mall that interests the user, and the AR device 101 may determine that the user has spent ten minutes in the vicinity of the store using information obtained by the GNSS receiver 124. Therefore, the AR device 101 may determine that an interest level of the user in this store is high, and may update the user profile 111 accordingly. The AR device 101 may further determine that a gaze of the user is directed at a particular object in the store for eight seconds, and that during this time period a dilation of the user's pupil and a heart rate of the user increased, based on information obtained from the front-facing camera 121, the eye-tracking camera 122, and the heart rate monitor 123. Accordingly, the AR device 101 may determine that an interest level of the user in the object is high, and may update the user profile 111 accordingly. The AR device 101 may capture images of text that is read by the user within the store, and may determine which words within the text excite the user based on information obtained by the sensors 120, and may update the user profile 111 accordingly. Therefore, the user profile 111 may be constantly updated in terms of ranking when user encounters other locations or objects that further excite the user.

The AI model 140 may be fed with the most current interest labels corresponding to the user profile 111 so that the AI model 140 may create customized content items such as video or AR advertisements for various products. For example, when the user approaches a new store that sells a particular product, the AR device 101 may identify the new store and obtain information about the product using information about a location of the new store obtained by the GNSS model, and/or information about the store captures by the front-facing camera 121. Then, the AR device 101 may select a theme based on recent top interests of the user which are compatible with the product, the AI model 140 may generate a customized content item, such as a video or AR advertisement for the product, based on the selected theme, and the AR device 101 may display the customized content item for the user, for example in a position anchored near an entrance of the new store.

In some embodiments, the customized content item may be generated based on a general content item obtained by the AR device 101. For example, after identifying the new store, the AR device 101 may obtain a general content item corresponding to the product from the server 105, and may customize the general content item using the AI model 140 based on the user's interests to generate the customized content item. For example, the AI model 140 may segment and remove portions of a general video advertisement obtained from the server 105, and may replace the removed portions with new portions generated based on the user's interests to create a customized video advertisement to present to the user. However, embodiments are not limited thereto. For example, in some embodiments, the customized content item may be generated based on a content item that is stored in the storage 110 of the AR device 101. Accordingly, the AR device 101 may generate customized content items even when the user is not connected to a network such as the network 102, for example when the user is exploring a new area in which access to the network 102 is not available. For example, the customized content item may be generated based on a pre-stored content item which is obtained using the network 102 and then stored in the storage 110 to be used after access to the network 102 is no longer available. As another example, the customized content item may be generated based on a content item that is entirely created by the AR device 101 and stored in the storage 110.

A detailed example of an operation of the system 100 and the AR device 101 according to embodiments is presented below. In this example, the user may wear the AR device 101 while walking down a street in Little Italy, a neighborhood with which the user may be unfamiliar. The AR device 101 may determine that the user is approaching a restaurant that sells seafood pasta based on location information obtained by the GNSS receiver 124, image information obtained from the front-facing camera 121, and an image search corresponding to the location information. Accordingly, the AR device 101 may display to the user a customized content item including a customized video advertisement near the door of the restaurant.

In this example, the user may be a fan of a roleplaying fantasy game, so the interest labels included in the user profile 111 may include information corresponding to text that was read by the user during a gameplay session of the roleplaying fantasy game. For example, the labels may include keywords such as adventurers, campground, and quest, which may have been selected for inclusion in the user profile 111 based on excitement detected using the heart rate monitor 123 and the eye-tracking camera 122. The user may also frequently watch cooking shows, and the AR device 101 may have previously detected that the user's gaze was directed at kitchenware for an extended period of time using information obtained from the front-facing camera 121 and the eye-tracking camera 122. Therefore, the user profile 111 may further indicate that the user is interested in cooking tools. These top interest labels are used as parameters to generate the video advertisement by the AI model 140. Accordingly, the video advertisement may be customized or curated for the user to include a group of adventurers catching fish from the pier, and cooking the seafood pasta that the restaurant is selling. The theme of a medieval time period may be determined by the AR device 101 because of the top interests overlapped a common category for creating a coherent advertisement. However, the next time the user visits a seafood pasta restaurant, the video may be different because the user may be interested in a different hobby and the interest labels included in the user profile 111 may be updated according to more frequent or more recent interests of the user. The customized video advertisement may be temporarily stored on the AR device 101 until user moves away from the location of the seafood pasta restaurant.

Accordingly, embodiments may assist businesses in attracting new customers or consumers. The customized content items according to embodiments may help users encounter new experiences by associating those new experiences with familiar interests. Embodiments may also reduce advertising costs while expanding audience reach by allowing businesses to more easily adapt to changes in seasons and trends while continuing to target potential customers with varying interests. Embodiments may also allow users to experience customized AR content for outdoor activities like exploring a new city while reducing the need to actively search, and may allow users to engage in exploration and enjoy relevant media as a supplement to the user's main activity. As discussed above, the customized content items may be generated based on content items which are obtained from the server 105 using the network 102, but embodiments are not limited thereto. For example, in some embodiments, the content items may be stored in the storage 110 of the AR device 101 so that the customized content items may be generated even when access to the network 102 is unavailable, for example when the user is exploring new areas which are out of range of the network 102, or when the AR device 101 is otherwise disconnected from the network 102.

FIG. 3 illustrates a process for generating customized content items, according to embodiments of the present disclosure. In embodiments, one or more operations of the process 300 may be performed by any of the elements discussed above, for example at least one of the system 100 and the elements included in therein, for example the AR device 101. According to embodiments, the process 200 may be referred to as, or may be an example of, a customized content item generation method.

In operation S301, the process 300 may include detecting a user interest in an object.

In operation S302, the process 300 may include, based on the detecting of the user interest, determining an interest level corresponding to the object.

In operation S303, the process 300 may include obtaining a content item to be presented to the user. In embodiments, the content item may correspond to the content items 112 stored in the storage 110 included in the AR device 101. Accordingly, the process 300 may be performed even when the AR device 101 is not connected to the network 102, for example when the user is using the AR device 101 in an area in which the user does not have access to the network 102, or in which the AR device 101 is otherwise disconnected from the network 102. However, embodiments are not limited thereto, and in some embodiments the content item may correspond to the content items 152 stored in the server 105, or any other content item.

In operation S304, the process 300 may include providing information about the object along with the content item to a generative AI model to obtain a customized content item. In embodiments, the generative AI model may correspond to the AI model 140 discussed above.

In operation S305, the process 300 may include presenting the customized content item to the user using an AR device. In embodiments, the AR device may correspond to the AR device 101 discussed above.

In embodiments, the user interest may be detected based on at least one of: determining that the user is at a location corresponding to the object, and determining that a gaze of the user is directed toward the object.

In embodiments, the interest level may be determined based on biological information of the user collected while at least one of the user is at the location corresponding to the object and the gaze of the user is directed toward the object.

In embodiments, the biological information may include at least one of a heart rate of the user, a pupil dilation of the user, a direction of the gaze, and a duration of the gaze.

In embodiments, at least one of the direction of the gaze, the duration of the gaze, and the pupil dilation may be determined using an eye-tracking sensor included in the AR device, the heart rate may be determined using at least one of an optical sensor and an electrical sensor included in the AR device, and wherein the location of the user may be determined using at least one of a camera included in the AR device and a global navigation satellite systems (GNSS) receiver included in the AR device. In embodiments, the eye-tracking sensor may correspond to the eye-tracking camera 122, the optical sensor and the electrical sensor may correspond to the heart rate monitor 123, and the GNSS receiver may correspond to the GNSS receiver 124 discussed above.

In embodiments, the object may include at least one of a real object detected in an environment of the user using a camera included in the AR device, and a virtual object presented to the user using a display included in the AR device.

In embodiments, the process 300 may further include: based on determining that the interest level is greater than the predetermined threshold interest level, updating a user profile associated with the user to include information about the object, the user profile may include information about at least one object for which a previous user interest has been detected, and the information about the object may be selected to be provided to the generative AI model based on the interest level and a similarity between the object and a theme corresponding to the content item.

In embodiments, the content item may be obtained based on determining that the user is at a location corresponding to the content item.

In embodiments, the customized content item may include at least one of an image, a video, and a text.

Figure 4:
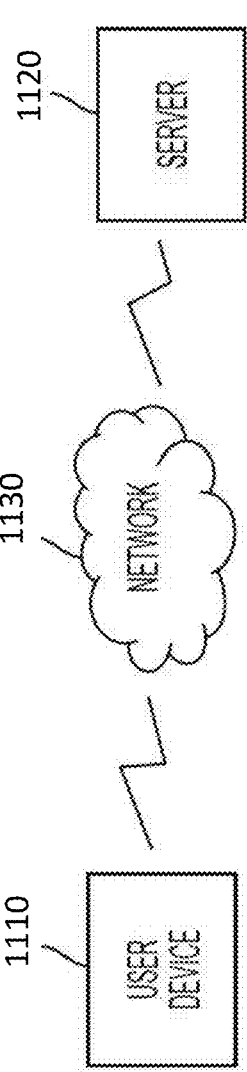
FIG. 4 is a diagram of devices for generating customized content items, according to embodiments of the present disclosure.

FIG. 4 is a diagram of devices for generating customized content items, according to embodiments of the present disclosure. FIG. 4 includes a user device 1110, a server 1120, and a network 1130. The user device 1110 and the server 1120 may interconnect via wired connections, wireless connections, or a combination of wired and wireless connections. An AR device illustrated in FIG. 1 may correspond to the user device 1110 or a combination of the user device 1110 and the server 1120. For example, one or more of the AR device 101, the mobile device 103, and the computer 104 illustrated in FIG. 1 may correspond to the user device 1110, the server 105 illustrated in FIG. 1 may be correspond to the server 1120, and the network 102 may correspond to the network 1130, but embodiments are not limited thereto.

The user device 1110 includes one or more devices configured to generate a customized content item. For example, the user device 1110 may include a computing device (e.g., a desktop computer, a laptop computer, a tablet computer, a handheld computer, a smart speaker, a server, etc.), a mobile phone (e.g., a smart phone, a radiotelephone, etc.), a camera device (e.g., a front-facing camera 121 and an eye-tracking camera 122 illustrated in FIG. 1), a wearable device (e.g., a pair of smart glasses or a smart watch), or a similar device.

The network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) may perform one or more functions described as being performed by another set of devices.

FIG. 5 is a diagram of components of one or more devices of FIG. 4 according to embodiments of the present disclosure. An electronic device 2000 may correspond to the user device 1110 and/or the server 1120.

The electronic device 2000 includes a bus 2010, a processor 2020, a memory 2030, an interface 2040, and a display 2050.

The bus 2010 includes a circuit for connecting the components 2020 to 2050 with one another. The bus 2010 functions as a communication system for transferring data between the components 2020 to 2050 or between electronic devices.

The processor 2020 includes one or more of a central processing unit (CPU), a graphics processor unit (GPU), an accelerated processing unit (APU), a many integrated core (MIC), a field-programmable gate array (FPGA), a digital signal processor (DSP), a machine learning accelerator, a neural processing unit (NPU). The processor 2020 may be a single core processor or a multi core processor. The processor 2020 is able to perform control of any one or any combination of the other components of the electronic device 2000, and/or perform an operation or data processing relating to communication. For example, the processor 2020 may include all or at least a part of the elements of the processor 130 illustrated in FIG. 1. The processor 2020 executes one or more programs stored in the memory 2030.

The memory 2030 may include a volatile and/or non-volatile memory. The memory 2030 stores information, such as one or more of commands, data, programs (one or more instructions), applications 2034, etc., which are related to at least one other component of the electronic device 2000 and for driving and controlling the electronic device 2000. For example, commands and/or data may formulate an operating system (OS) 2032. Information stored in the memory 2030 may be executed by the processor 2020. In particular, the memory 2030 may store original images and processed images (e.g., color transformed images).

The applications 2034 include the above-discussed embodiments. In particular, the applications 2034 may include programs to perform one or more operations discussed above. These functions can be performed by a single application or by multiple applications that each carry out one or more of these functions.

The display 2050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 2050 can also be a depth-aware display, such as a multi-focal display. The display 2050 is able to present, for example, various contents, such as text, images, videos, icons, and symbols.

The interface 2040 includes input/output (I/O) interface 2042, communication interface 2044, and/or one or more sensors 2046. The I/O interface 2042 serves as an interface that can, for example, transfer commands and/or data between a user and/or other external devices and other component(s) of the electronic device 2000.

The communication interface 2044 may enable communication between the electronic device 2000 and other external devices, via a wired connection, a wireless connection, or a combination of wired and wireless connections. The communication interface 2044 may permit the electronic device 2000 to receive information from another device and/or provide information to another device. For example, the communication interface 2044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 2044 may receive or transmit information such as information about a user profile and information about a content item from or to an external device.

The sensor(s) 2046 of the interface 2040 can meter a physical quantity or detect an activation state of the electronic device 2000 and convert metered or detected information into an electrical signal. For example, the sensor(s) 2046 can include one or more cameras (e.g., a front-facing camera 121 and/or an eye-tracking camera 122 illustrated in FIG. 1) or other imaging sensors for capturing images, and any other sensor for collecting or obtaining information about an object or location corresponding to a user and the user's interest in or reaction to the object or the location (e.g., a heart rate monitor 123 and/or a GNSS receiver 124 illustrated in FIG. 1). The sensor(s) 2046 can also include any one or any combination of a microphone, a keyboard, a mouse, and one or more buttons for touch input. The sensor(s) 2046 can further include an inertial measurement unit. In addition, the sensor(s) 2046 can include a control circuit for controlling at least one of the sensors included herein. Any of these sensor(s) 2046 can be located within or coupled to the electronic device 2000.

The customized content item generation method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to an electronic device, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The customized content item generation method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of a server.

A model related to the neural networks described above may be implemented via a software module. When the model is implemented via a software module (for example, a program module including instructions), the model may be stored in a computer-readable recording medium.

Also, the model may be a part of the electronic device described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

While the embodiments of the disclosure have been described with reference to the figures, it will be understood by those of ordinary skill in the art that various changes in form and details may be made therein without departing from the spirit and scope as defined by the following claims.

What is claimed is:

1. A method for generating a customized content item, the method comprising:

detecting a user interest of a user in an object;

based on the detecting of the user interest, determining an interest level corresponding to the object;

obtaining a content item to be presented to the user;

based on the interest level corresponding to the object being greater than a predetermined threshold interest level, providing information about the object along with the content item to a generative artificial intelligence (AI) model to obtain the customized content item; and presenting the customized content item to the user using an augmented reality (AR) device, wherein the information about the object is selected to be provided to the generative AI model based on the interest level and a similarity between the object and a theme corresponding to the content item.

2. The method of claim 1, wherein the user interest is detected based on at least one of:

determining that the user is at a location corresponding to the object, and determining that a gaze of the user is directed toward the object.

3. The method of claim 2, wherein the interest level is determined based on biological information of the user collected while at least one of the user is at the location corresponding to the object and the gaze of the user is directed toward the object.

4. The method of claim 3, wherein the biological information comprises at least one of a heart rate of the user, a pupil dilation of the user, a direction of the gaze, and a duration of the gaze.

5. The method of claim 4, wherein at least one of the direction of the gaze, the duration of the gaze, and the pupil dilation is determined using an eye-tracking sensor included in the AR device, wherein the heart rate is determined using at least one of an optical sensor and an electrical sensor included in the AR device, and wherein the location of the user is determined using at least one of a camera included in the AR device and a global navigation satellite systems (GNSS) receiver included in the AR device.

6. The method of claim 1, wherein the object comprises at least one of a real object detected in an environment of the user using a camera included in the AR device, and a virtual object presented to the user using a display included in the AR device.

7. The method of claim 1, further comprising:

based on determining that the interest level is greater than the predetermined threshold interest level, updating a user profile associated with the user to include the information about the object, wherein the user profile comprises information about at least one object for which a previous user interest has been detected.

8. The method of claim 1, wherein the content item is obtained based on determining that the user is at a location corresponding to the content item.

9. The method of claim 1, wherein the customized content item comprises at least one of an image, a video, and a text.

10. An augmented reality (AR) device for generating a customized content item, the AR device comprising:

an eye-tracking sensor configured to obtain gaze information about a gaze of a user;

a location sensor configured to determine location information about a location of the user;

at least one biological sensor configured to measure biological information of the user;

a display configured to present content items to the user; and at least one processor configured to:

detect a user interest of the user in an object based on at least one of the gaze information and the location information;

based on the detecting of the user interest, determine an interest level corresponding to the object based on at least one of the gaze information and the biological information;

obtain a content item to be presented to the user;

based on the interest level being greater than a predetermined threshold interest level, provide information the object and the content item to a generative artificial intelligence (AI) model to obtain the customized content item;

present the customized content item to the user, wherein the information about the object is selected to be provided to the generative AI model based on the interest level and a similarity between the object and a theme corresponding to the content item.

11. The AR device of claim 10, wherein the user interest is detected based on at least one of:

determining that the user is at a location corresponding to the object, and determining that the gaze of the user is directed toward the object.

12. The AR device of claim 10, wherein the biological information of the user is collected while at least one of the user is at the location corresponding to the object and the gaze of the user is directed toward the object.

13. The AR device of claim 12, wherein the biological information comprises at least one of a heart rate of the user, a pupil dilation of the user, a direction of the gaze, and a duration of the gaze.

14. The AR device of claim 13, wherein at least one of the direction of the gaze, the duration of the gaze, and the pupil dilation is determined using the eye-tracking sensor included in the AR device, wherein the heart rate is determined using at least one of an optical sensor and an electrical sensor included in the AR device, and wherein the location of the user is determined using at least one of a camera included in the AR device and a global navigation satellite systems (GNSS) receiver included in the AR device.

15. The AR device of claim 10, wherein the object comprises at least one of a real object detected in an environment of the user using a camera included in the AR device, and a virtual object presented to the user using the display.

16. The AR device of claim 10, wherein the at least one processor is further configured to, based on determining that the interest level is greater than the predetermined threshold interest level, update a user profile associated with the user to include the information about the object, wherein the user profile comprises information about at least one object for which a previous user interest has been detected.

17. The AR device of claim 10, wherein the content item is obtained based on determining that the user is at a location corresponding to the content item.

18. The AR device of claim 10, wherein the customized content item comprises at least one of an image, a video, and a text.

19. A non-transitory computer-readable medium configured to store instructions which, when executed by at least one processor of a device for generating a customized content item, cause the at least one processor to:

detect a user interest of a user in an object;

based on the detecting of the user interest, determining an interest level corresponding to the object;

obtain a content item to be presented to the user;

based on the interest level corresponding to the object being greater than a predetermined threshold interest level, provide information about the object along with the content item to a generative artificial intelligence (AI) model to obtain the customized content item; and present the customized content item to the user using an augmented reality (AR) device, wherein the information about the object is selected to be provided to the generative AI model based on the interest level and a similarity between the object and a theme corresponding to the content item.

20. The non-transitory computer-readable medium of claim 19, wherein the instructions further cause the at least one processor to: based on determining that the interest level is greater than the predetermined threshold interest level, update a user profile associated with the user to include the information about the object, wherein the user profile comprises information about at least one object for which a previous user interest has been detected.

\* \* \* \* \*